United States Patent
Rauhala

(10) Patent No.: US 11,038,600 B2
(45) Date of Patent: Jun. 15, 2021

(54) WIRELESS AUDIO STREAMING SYSTEM FOR SWIMMERS AND UNDER WATER APPLICATIONS

(71) Applicant: Finnovate Group LLC, Solana Beach, CA (US)

(72) Inventor: Kari Kristian Rauhala, Solana Beach, CA (US)

(73) Assignee: FINNOVATE GROUP LLC, Solana Beach, CA (US)

( * ) Notice: Subject to any disclaimer, the term of this patent is extended or adjusted under 35 U.S.C. 154(b) by 0 days.

(21) Appl. No.: 15/860,479

(22) Filed: Jan. 2, 2018

(65) Prior Publication Data

US 2018/0234190 A1    Aug. 16, 2018

Related U.S. Application Data

(60) Provisional application No. 62/505,746, filed on May 12, 2017, provisional application No. 62/441,039, filed on Dec. 30, 2016.

(51) Int. Cl.

| | |
|---|---|
| *H04B 13/02* | (2006.01) |
| *H04R 1/44* | (2006.01) |
| *H04B 5/00* | (2006.01) |
| *G11B 20/10* | (2006.01) |
| *H04R 1/10* | (2006.01) |

(52) U.S. Cl.
CPC ....... *H04B 13/02* (2013.01); *G11B 20/10527* (2013.01); *H04B 5/0006* (2013.01); *H04R 1/44* (2013.01); *G11B 2020/10546* (2013.01); *H04R 1/1016* (2013.01); *H04R 1/1041* (2013.01); *H04R 2205/021* (2013.01); *H04R 2420/07* (2013.01)

(58) Field of Classification Search
CPC ...................................................... H04B 13/02
See application file for complete search history.

(56) References Cited

U.S. PATENT DOCUMENTS

| | | | | |
|---|---|---|---|---|
| 4,866,229 | A * | 9/1989 | Scharfenberg | G02B 27/017 250/203.3 |
| 9,838,119 | B1 * | 12/2017 | Stein | H04B 10/1143 |
| 9,860,786 | B1 * | 1/2018 | Wang | H04W 28/06 |
| 2002/0196953 | A1 * | 12/2002 | Burke | A63B 33/002 381/309 |
| 2012/0116861 | A1 * | 5/2012 | Dobyns | G06Q 30/0234 705/14.34 |
| 2015/0011273 | A1 * | 1/2015 | Wilmhoff | H01Q 1/245 455/575.7 |

\* cited by examiner

*Primary Examiner* — Hsinchun Liao
(74) *Attorney, Agent, or Firm* — Kilpatrick Townsend & Stockton LLP

(57) ABSTRACT

A wireless audio streaming system for swimmers and underwater applications uses directional transmission antennas, one or more reception antennas worn on a user, and a combination of radio frequency and near-field magnetic induction communication, for streaming audio to a swimmer, buffering the streamed audio, and allowing the user to play the audio on a wireless, waterproof headset.

10 Claims, 17 Drawing Sheets

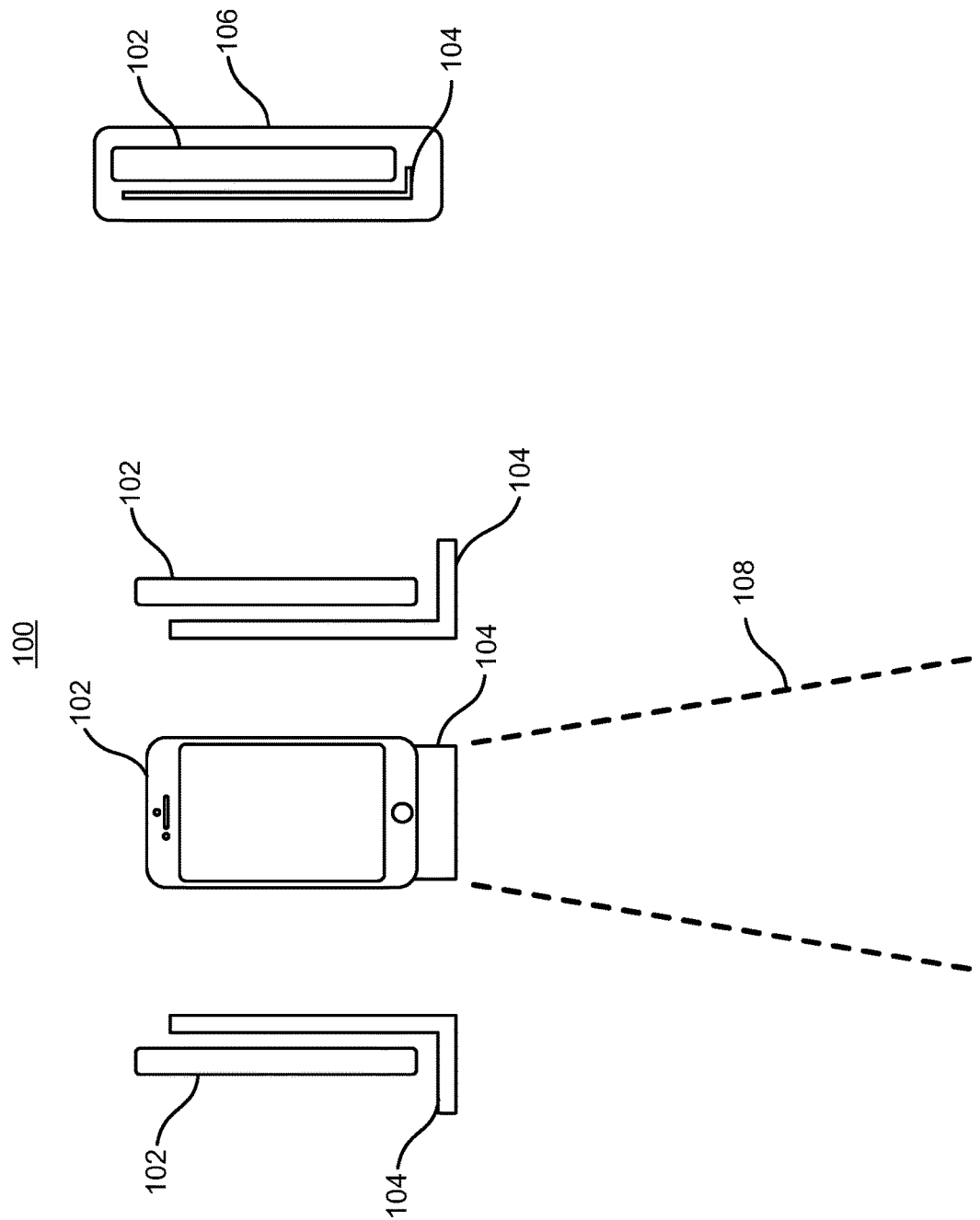

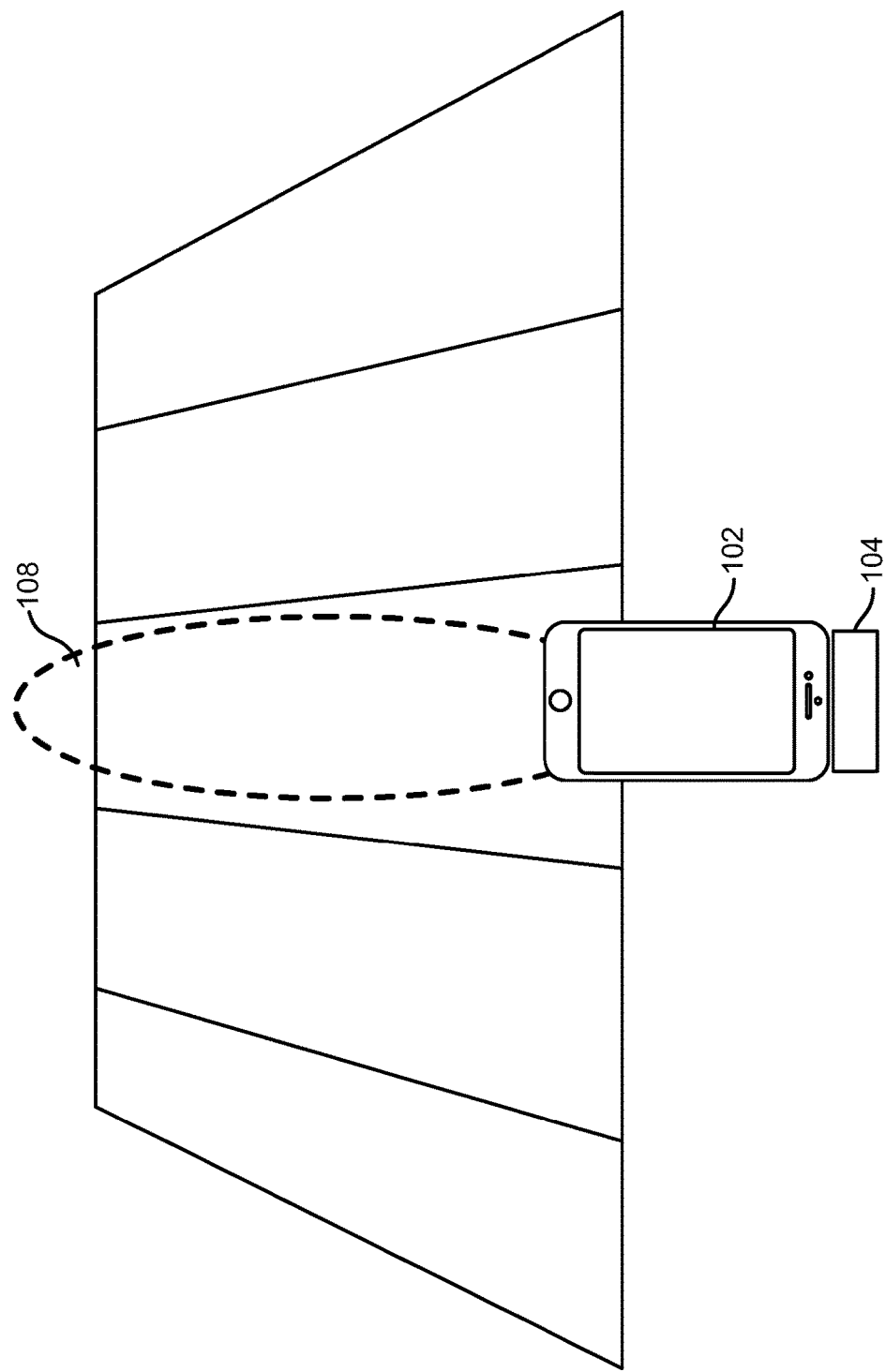

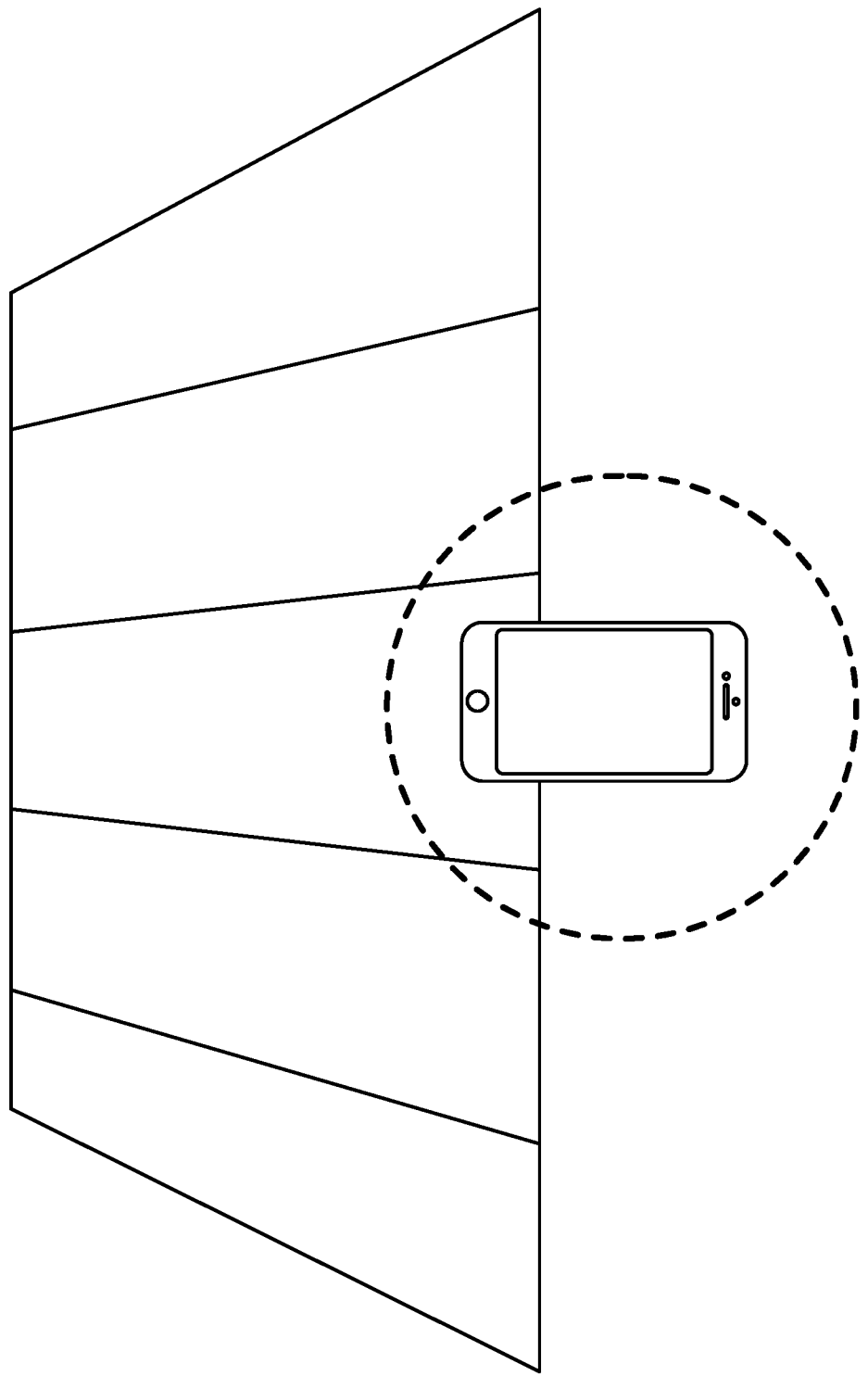

$\mu_0 = 4\pi \times 10^{-7}$
N = number of turns
I = current in the loops
a = radius of coil
r = distance between centre of coil to point of measurement P Magnetic Field Intensity of Antenna
By Biot-Savart Law:

$$B_z = \frac{\mu_0 \cdot I \cdot N}{2} \cdot \frac{a^2}{(a^2 + r^2)^{3/2}} \qquad \text{(eq. 1)}$$

for $r^2 >> a^2$;

$$B_z = \frac{\mu_0 \cdot I \cdot N}{2} \cdot \frac{a^2}{r^3} \qquad \text{(eq. 2)}$$

WIRELESS AUDIO STREAMING SYSTEM FOR SWIMMERS AND UNDER WATER APPLICATIONS

CROSS-REFERENCE TO RELATED APPLICATION

The current application claims priority to U.S. Provisional patent application Ser. No. 62/441,039, filed on Dec. 30, 2016, entitled "WIRELESS AUDIO STREAMING SYSTEM FOR SWIMMERS AND UNDER WATER APPLICATIONS" and U.S. Provisional patent application Ser. No. 62/505,746, filed May 12, 2017, entitled "WIRELESS AUDIO STREAMING SYSTEM FOR SWIMMERS AND UNDER WATER APPLICATIONS", which is incorporated by reference herein in its entirety.

BACKGROUND

An extremely useful device for swimmers or for other activity in an aquatic environment is waterproof headphones. These devices can take the form of small ear-insertable "ear buds" or headphones having left and right speakers with a flexible cover to fit over the wearer's ears. Waterproof headphones conventionally receive audio signals from an audio or media player device via a small wire.

Increasingly, there is a move away from such "wired" connections between a media player device and a wearer's headphones. Now, headphones include a wireless receiver that receives audio signals wirelessly, using radio frequency (RF) transmission from a transmitting device, such as a media player device. Conventional smartphones and other intelligent "wearable" communication devices, which often include a media player, wireless transmission antenna power can be omnidirectional yet limited in distance, particularly for Bluetooth wireless transmissions. In aquatic environments, a swimmer is sometimes underwater and unreachable via RF transmission. Most wireless RF frequencies, such as Bluetooth (BT) at 2.4 GHz, either do not penetrate the water or do not travel or propagate in water.

Many devices use BT or other types of frequencies in the RF spectrum of frequencies to communicate or to transfer data between devices. Bluetooth has become a very popular means of wireless data communication used for streaming audio to headphones, for example, and as a means to communicate to cellular smartphone accessories, such as Bluetooth receivers, etc. As discussed above, radio frequencies used by Bluetooth, such as BT 2.4 GHz, do not penetrate water and therefore cannot be used in underwater or aquatic-based applications, or cannot be used in environment where an obstacle (such as a human body) blocks the RF signal.

Accordingly, most smartphone or wearable communication devices running applications for downloading and/or receiving streaming media from a media server, such as Spotify®, Pandora®, or the like, will not work with wireless RF headphones and accessories in an aquatic environment.

SUMMARY

This document describes a wireless audio streaming system for swimmers and underwater applications. The system includes a wireless communication device, such as a smartphone or other wearable communication device, and wireless headphones adapted for being used in the aquatic environment. The wireless communication device includes an application, or "app," for downloading and/or streaming media, such as music, videos, data, etc., from a media server. The app further transmits the media over an RF channel, such as Bluetooth, to the wireless headphones.

In some aspects, the system includes a directional antenna to improve a range of Bluetooth transmissions, particularly in a lap pool. The directional antenna can relay Bluetooth or other RF signals, which are normally transmitted omnidirectionally, to a highly directional radiation pattern. In other aspects, a special wireless headset is employed, in conjunction with a media buffer system to avoid disruptions of media streaming when an RF connection is lost or obscured by water. In yet other aspects, a wireless communication device, such as a smartphone, can count laps of a swimmer, and correlate signal strength to the lap count. In yet other aspects, a wireless media streaming system for an aquatic environment can use near field magnetic induction (NFMI) communication, alone or in combination with another wireless communication technologies or protocols.

NFMI uses a magnetic field that does not suffer same issues as Bluetooth (BT), and works well in an aquatic environment. In other aspects, a system, method and apparatus is disclosed whereby NFMI is used to bridge BT communications, in which the BT communications are received by a bridge module, which transmits the same data (as-is or enhanced) over an NFMI link to another NFMI device. The benefit of such a NFMI bridge module is that many of the applications and BT enabled devices can now be used in water environments without changes to the devices.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIGS. 1A-C illustrate a directional antenna of a wireless audio streaming system;

Like reference symbols in the various drawings indicate like elements.

DETAILED DESCRIPTION

Figure 2A:
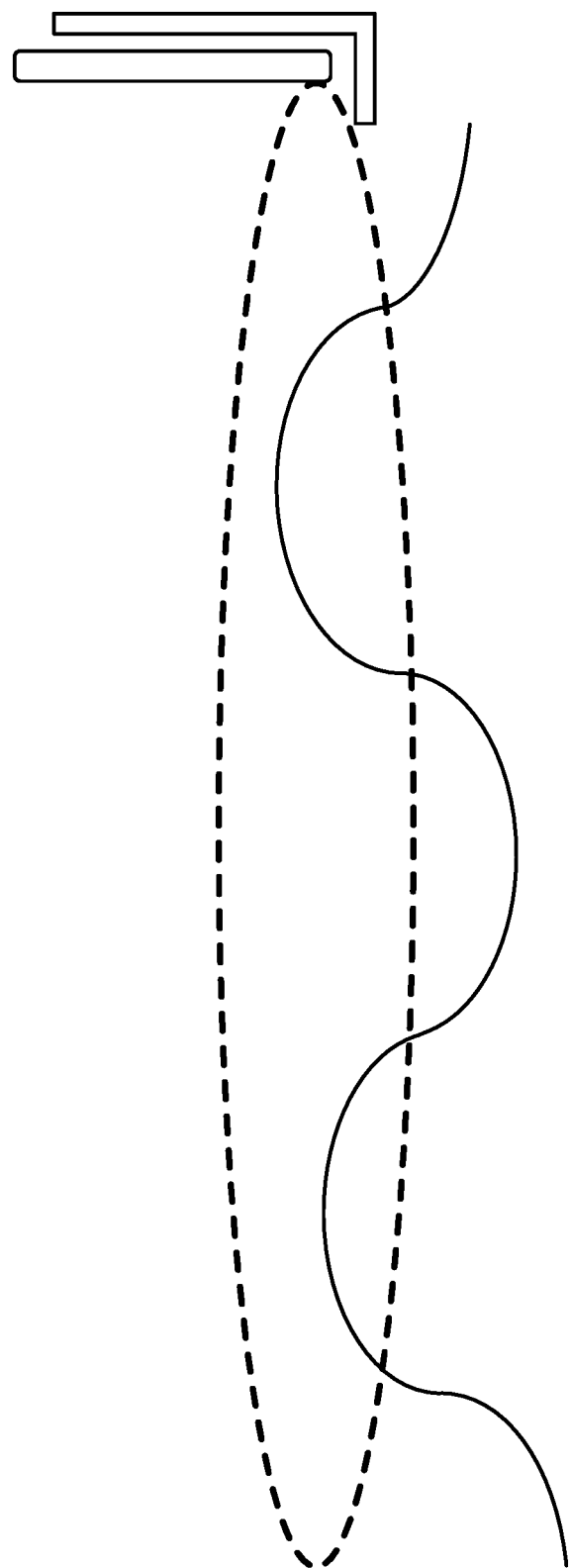
FIGS. 2A-B illustrate a media buffer of a wireless audio streaming system.

This document describes a wireless audio streaming system, and methods thereof, for swimmers, underwater applications, and other aquatic-related environments.

FIGS. 1A and 1B illustrate a wireless audio streaming system 100, in which a media player 102 has wireless transmission capabilities. The media player 102 can be a standalone device, such as an Apple® iPOD® or the like, or can be integrated in another electronic device, such as a smartphone, or smart speaker, or personal digital assistant (PDA). The wireless transmission capabilities can include RF transmissions, such as Bluetooth, WIFI, or the like, but has a normal, non-directional radiation pattern as illustrated in FIG. 1C. The media player 102 can play or stream media such as audio directly from a local media storage, or via a media server executing a media streaming application such as Spotify®, Pandora®, or the like.

The wireless audio streaming system 100 further includes a directional antenna 104 that is communicatively coupled with the media player 102, either by wired or wireless connection. For instance, the directional antenna 104 can be communicatively coupled with the media player 102 via inductive coupling, NFMI, WIFI, or other wireless communication protocol, or by wired connection such as through the smartphone's headphone jack, for instance.

In some implementations, to improve the range of wireless transmissions from the media player 102, as shown in FIGS. 1A and 1B, the directional antenna 104 is positioned on/near the smartphone to create inductive coupling between the directional antenna 104 and an antenna associated with the media player 102, in which the directional antenna 104 receives RF signals (i.e. streaming audio via BT, for example) from the media player 102. The directional antenna 104 then directs the RF signals in a directional way, in a radiation pattern 108, toward an aquatic environment, such as down a swim lane as shown in FIG. 1B, for example, for eventually being received by a wireless receiver and headphones worn by a user. The coupling between the directional antenna 104 and the media player 102 extends a normal BT transmission range for the lap pool distance and avoids wasting transmission energy transmitting into directions where the user is not present.

The directional antenna 104 can be inductively coupled with the media player 102 can be external and connected via a wire or cable. In some implementations, the directional antenna 104 can be built into a case 106 and/or a cradle or stand, which can hold and place the media player 102 in an optimal position for inductive coupling, and for directing the energy in the desired directional radiation pattern, such as down a swim lane of a pool for example, as shown in FIG. 1B. The case 106 and/or cradle can be waterproof. The media player 102, directional antenna 104, or case 106 can include indicators for the user where the RF signal is directed, such as a graphical representation (electronic or otherwise) of an arrow representing the optimal directionality of the radiation pattern from the directional antenna 104.

In a use case according to some implementations, the user sets the case 106 containing the media player 102 and the directional antenna 104 on a side of a pool, such as at the end of the swim lane, and points the arrow down the desired direction. In alternative implementations, the directional antenna 104 can be bi-directional, and the case 106 can be placed or positioned in the middle of the pool, such as on the side of the pool or floating in the pool, such as on a lane line that demarcates the swim lane. In yet other implementations, the directional antenna 104 includes a tracking mechanism and a beamforming mechanism, which, along with "smart" logic, can track a position of the user and adjust the direction of the radiation pattern based on the user's movements. The tracking mechanism can include a digital camera or other electronic sensor. Alternatively, the case 106 can include a moving mechanism to rotate or move the case 106 to any desired position or orientation.

In cases in which a user may go under water from time to time, such as when swimming (reference A in FIG. 2A), and lose RF connection from the media player or media server, a waterproof wireless headphone with a media buffer system can be used to avoid disruptions of media reception and playing when the RF connection is lost. The buffer system includes a buffer storage, and operates according to an algorithm for most effective or optimal reception of media data (reference B in FIG. 2A) for playing the media through the headphones.

Figure 2B:
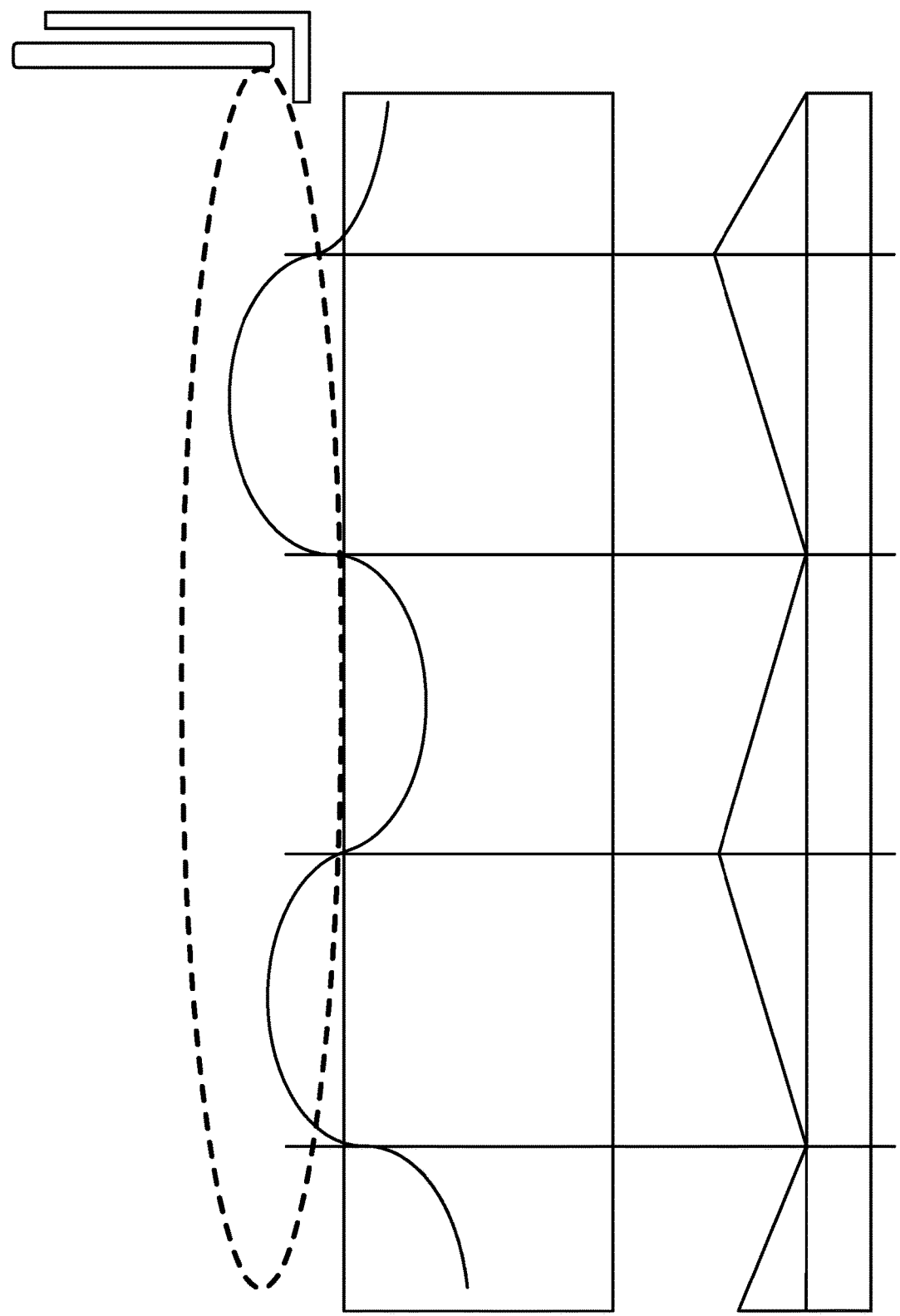
Figure 3:
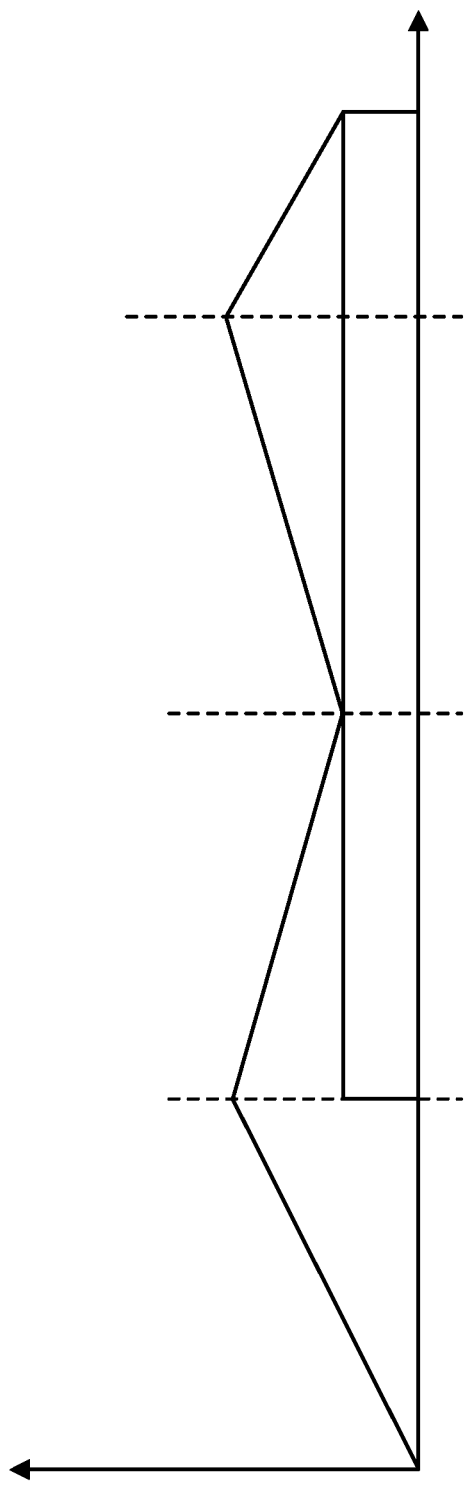
FIG. 3 illustrates a buffering method for a wireless audio streaming system for an aquatic environment.

As further illustrated in FIGS. 2A-2B, the wireless headset has a special buffering mode that the user selects manually, to receive successive portions of the media stream, which are stored and played in succession without disruption of the total stream. The buffering may have several levels and durations the user can select. For example, as shown in FIG. 3, when the buffering is turned 'on', the headset buffers the media for a period of time. The buffer can be sized and adapted to extend and cover the media playing duration when the user is out of range or under water. Alternatively, the size of the buffer may be dynamic or dynamically adjustable. The buffering level can be indicated with a visual indicator, such as one or more light emitting diodes (LEDs) that represent the buffering level, by or tactile representations, such as vibration, on the headset. The user can be continuously or intermittently alerted about the status of the buffer. When the buffer is full, an audio sound or tactile vibration may be played to the user, according to the algorithm. When available buffer memory is getting low, an audio sound/warning or tactile vibration may also be played to the user via the headset or by a separate alert device.

Figure 10:
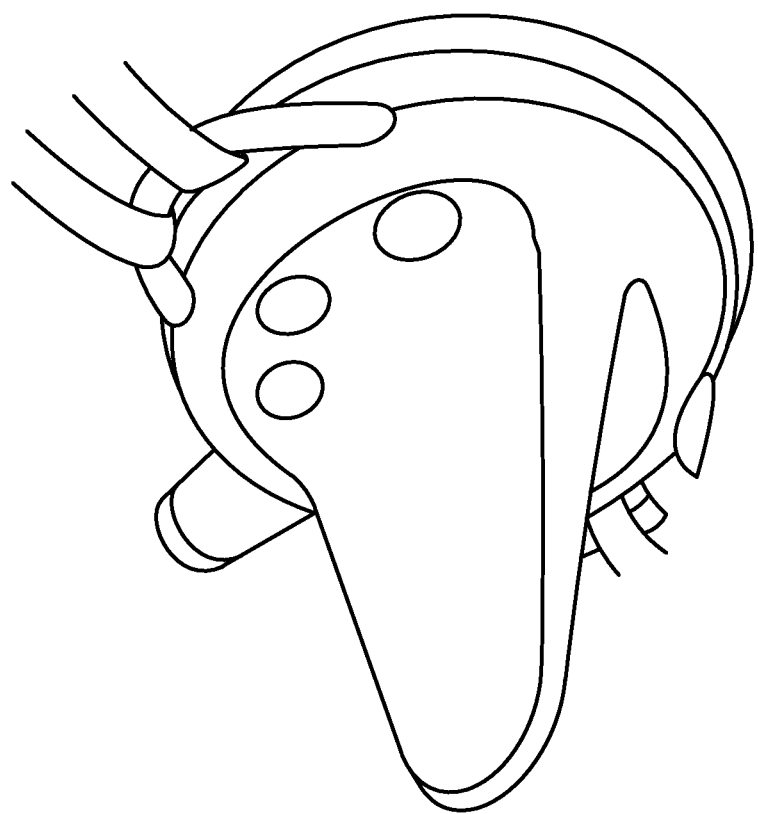
FIG. 10 illustrates an implementation of a user headset of a wireless audio streaming system.

If the user wants to skip forward to a next track, such as by operating a button on the user's headset (as shown in FIG. 10), to avoid the loss or delay to start the next song, the headset can be buffering and receiving portions of two or more media streams simultaneously (i.e., a current track and the next track) and buffer several songs or media files in advance. In this manner, if the user skips forward, the media can be played from a different section (i.e. the next track section) of the buffer. The buffering mode may be activated automatically by detecting water, or by an estimated distance, or by packet loss from the media player. In some instances, a buffering process can be designed to last a transmission loss time, such as an average duration of a swim lap in a pool (i.e., a 25 meter or 50 meter pool), so as to be able to predict when user is in range or above the surface of the water, so that the media player can send a burst of data for buffering by the buffer system.

To reduce loss or degradation of RF signals at the headset, the headset may have one or more antenna that can be extra and removable. For example, the headset may have a primary antenna for receiving RF signals, and a secondary antenna that is longer than the primary antenna so as to be able to be above water more often, and to reduce a time in which RF reception might be lost. In some implementations, the headset may have two or more antennas; i.e. one antenna positioned on either side of the user's head, and as the user breaths on one side, at least one antenna is kept above water for receiving the transmission of media. In other implementations, the headset's extra antenna may be floating or attached to a floating foam to reduce or keep it from submerging. Or, the headset extra antenna maybe attached to swim goggles. The swim goggle strap may have an integrated antenna, as embedded in a rubber elastic strap.

The media player or headset can also keep track of any of a number of performance metrics, such as count laps or measure distance traveled, based at least in part on calculated reception power. For instance, a smartphone can be used as a base station to measure the performance metrics, and can correlate signal strength to swimmer lap count, pace, distance, etc.

Figure 4A:
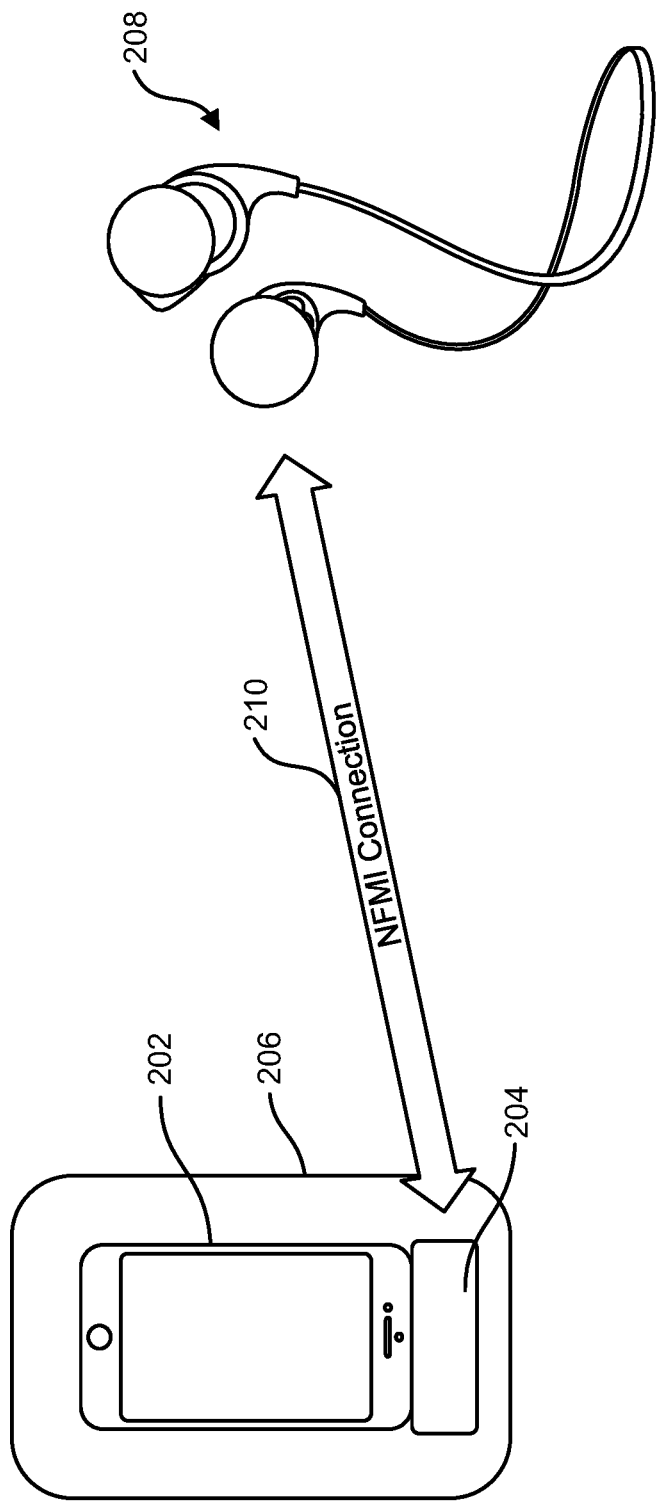
FIGS. 4A-E illustrate a wireless audio streaming system using near field magnetic induction for streaming media.
Figure 4B:
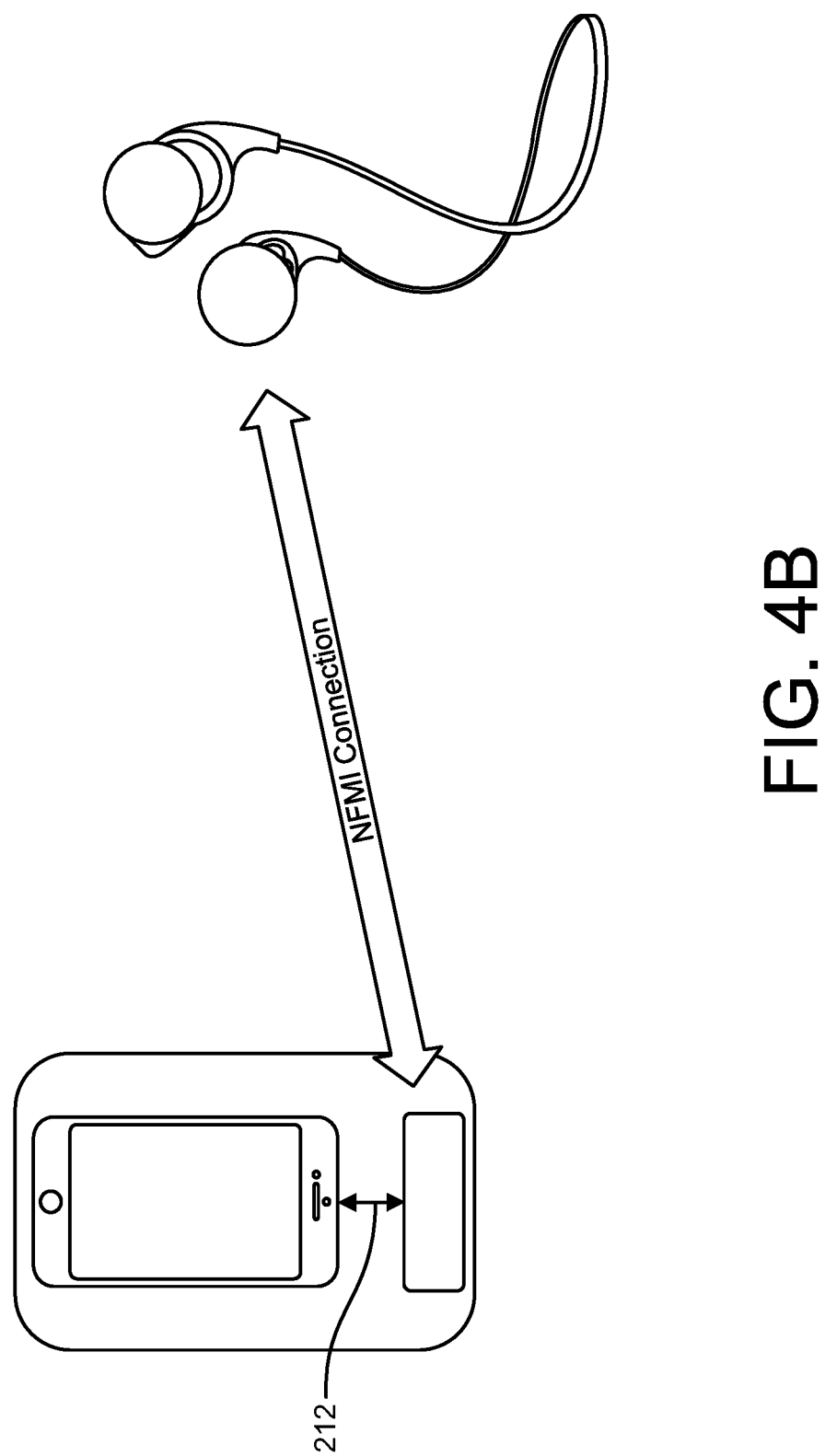

In some implementations, a wireless audio streaming system uses near field magnetic induction (NFMI) for underwater communication. As shown in FIG. 4A, in addition to, or instead of, using RF communication (such as BT 2.4 GHz transmission) a media player 202 and/or case 206 or cradle can include an NFMI module 204, which is configured to convert data from an RF communication protocol to an NFMI protocol, and send the media/data over a magnetic induction connection 210 to a headset 208 that can be worn by a user. As shown in FIG. 4B In some cases, the NFMI connection 210 could overlap or augment a BT connection 212.

Figure 4C:
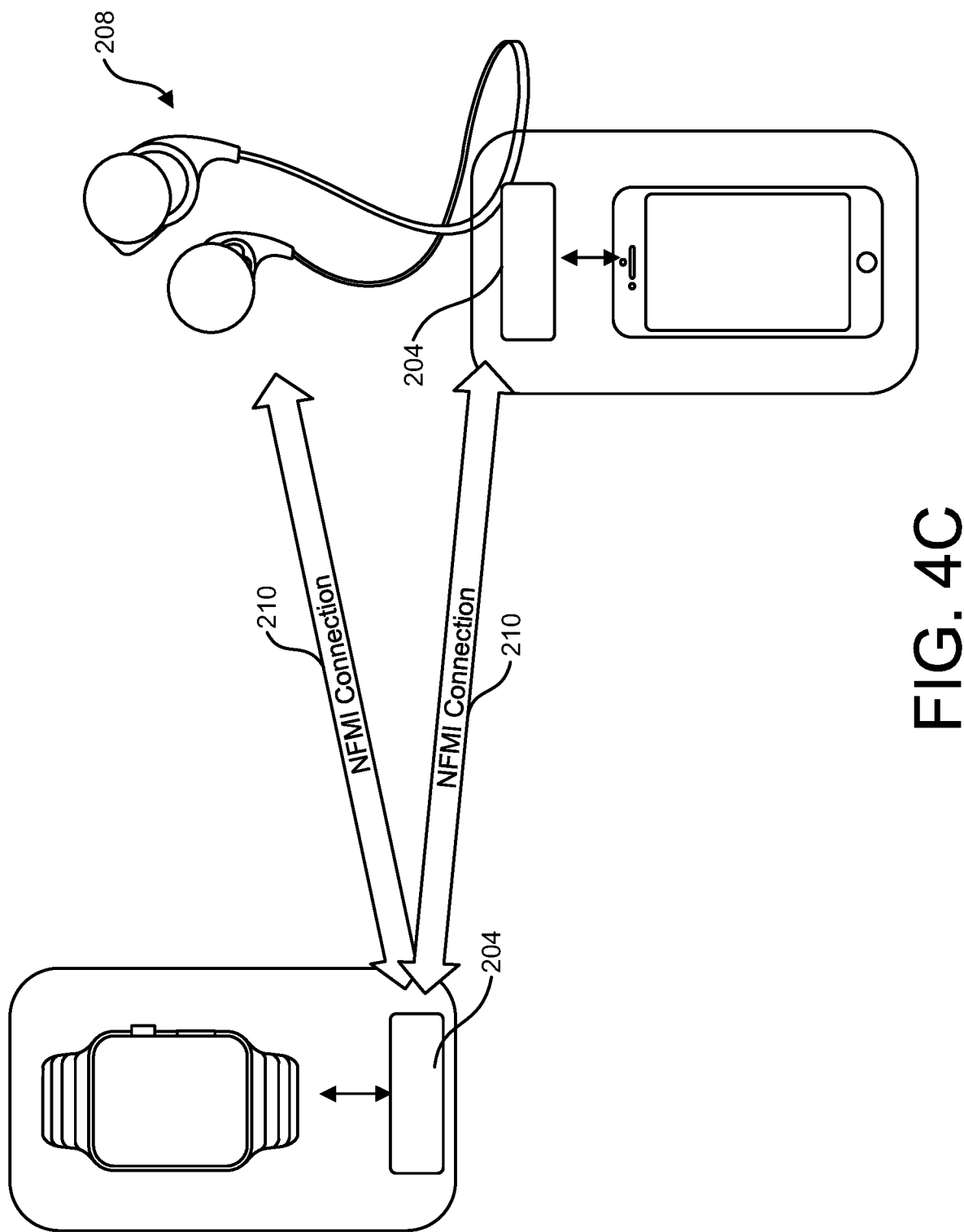
Figure 4D:
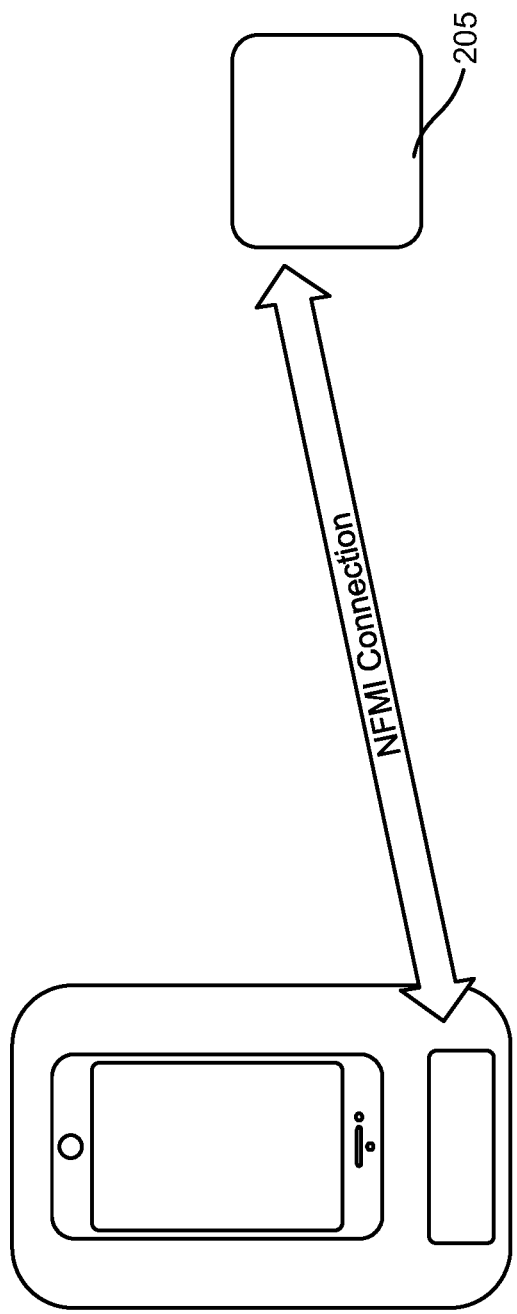

The NFMI connection 210 can be directly coupled to the media player 202, or the NFMI connection 210 can be wirelessly coupled to the media player 202 via BT connection 212 or other RF medium. To extend the NFMI range, as shown in FIG. 4C, several NFMI modules 204 can be installed as a relay or a network to cover larger areas using multiple NFMI connections 210. For example, as illustrated in FIG. 4D, an external NFMI module 205 can be positioned in the pool, such as on lane markers or "lane lines." The NFMI modules 204, 205 can connect to a WLAN and bridge the data to a wireless headset or external NFMI module 205 that is under water.

Figure 4E:
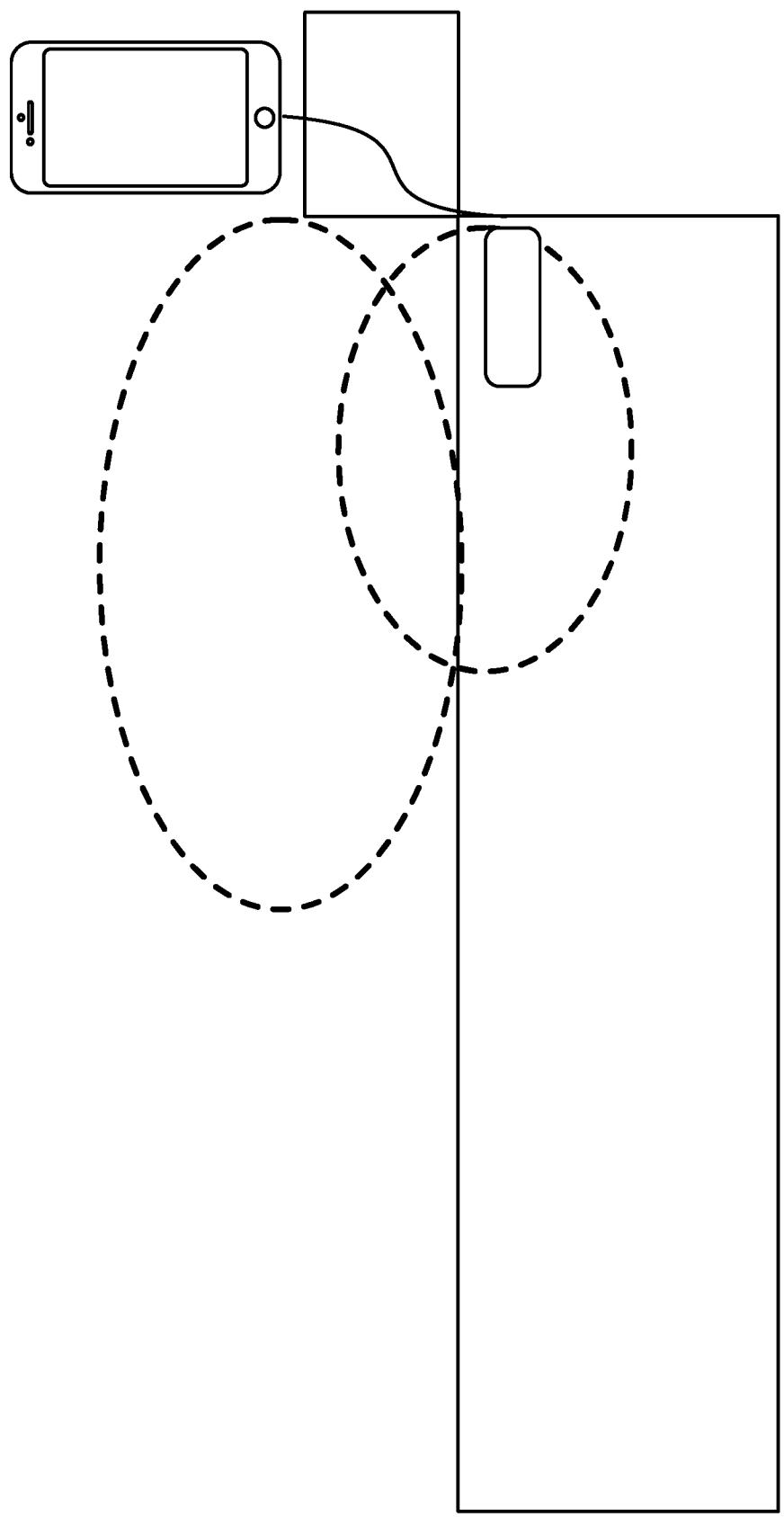

Magnetic induction converter enclosure for near-field use in water. The enclosure could transfer/convert data from smart watch to smartphone, or smart watch to wireless headset/speaker, from smart phone to speaker, etc. A smart phone or watch can be connected into a case (Magnetic induction converter enclosure) that sends data over a magnetic induction connection to a wireless headset. The NFMI module can convert to/from other wireless RF signals (such as BT, WLAN, GSM, etc.) to NFMI signal. The NFMI module could be a wireless remote to a BT device for near filed user that also works underwater, as illustrated in FIG. 4E.

A waterproof headset, or waterproof band for a smartphone, can also include a waterproof microphone, such as a piezoelectric MEMS microphone. The microphone is preferably a very low power consumption microphone, and can be passively listening to, and recording, the user during underwater activities, such as the user's breathing, the user's motion in the water, etc. The recording can be used to estimate user breathing frequency, kicking frequency, stroke cadence, etc. Further, the user can make certain predetermined or pre-programmed noises (while keeping his/her mouth closed under water) that can be interpreted by the system as audio control for the media player or streaming media.

Figure 5:
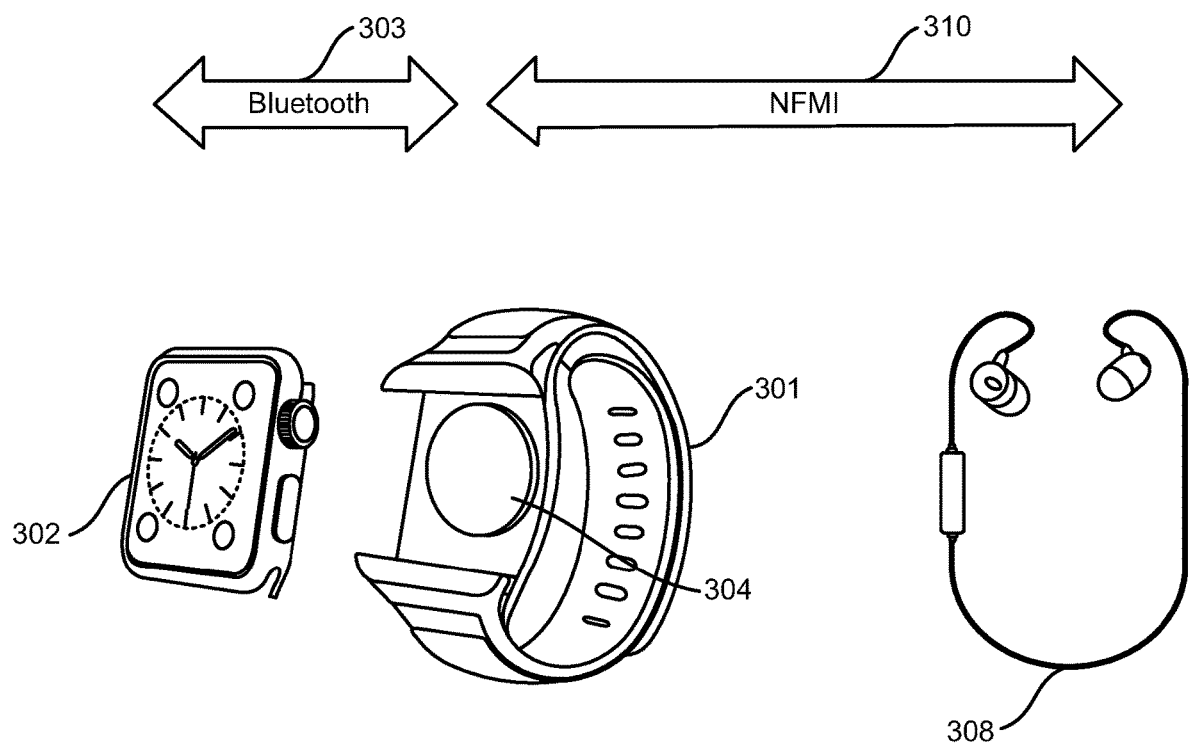
FIG. 5 illustrates a small NFMI module located on/touching a BT device so that it is able to receive BT signals from the device.

In accordance with other implementations, such as is illustrated in FIG. 5, a small NFMI module 304 is located on/touching or at least very close to the BT device, such as a smart watch 302, and is able to receive BT signals 303 from the BT device, even under water. For example, as is further illustrated in FIG. 6, the NFMI module 304 could be installed in a smart watch band 301 where it is able to receive BT transmission from the smart watch even when under water, and then transmit the media stream to a headset 308 via NFMI connection 310.

In real-time or after certain buffering, the module then conveys the data over an NFMI connection 310 (also referred to as link or channel) to a separate NFMI receiver, such as NFMI enabled headphones, for example. In this example, the watch streams music on Bluetooth. The NFMI module 304 is paired with the watch per normal BT standard discovery, linking and synchronization processes, and the NFMI module 304 is "discovered" by the watch as BT headphones. The watch then sends audio streaming to the NFMI module 304 over Bluetooth. The NFMI module 304 receives the audio and, in near real-time, passes the audio over to NFMI headphones 308 via NFMI connection 310. The NFMI headphones 308 receive the audio stream and play it on the speaker to the user. The NFMI module 304 can also be coupled with standard BT headphones, in other examples.

In some implementations, an NFMI transceiver provides a digital wireless link by magnetically coupling two inductors. The NFMI link for wireless data communication behaves exactly like an inductively coupled transformer, based on a transmitter antenna acting as the primary transformer winding and the receiver antenna acting as the secondary winding. An AC current, modulated by the data to be transmitted, flows through a transmitter coil, which is similar in design to a solenoid. A magnetic field is generated by the transmitter which induces a current in the winding of the antenna in the receiver, which is then demodulated.

Figure 6:
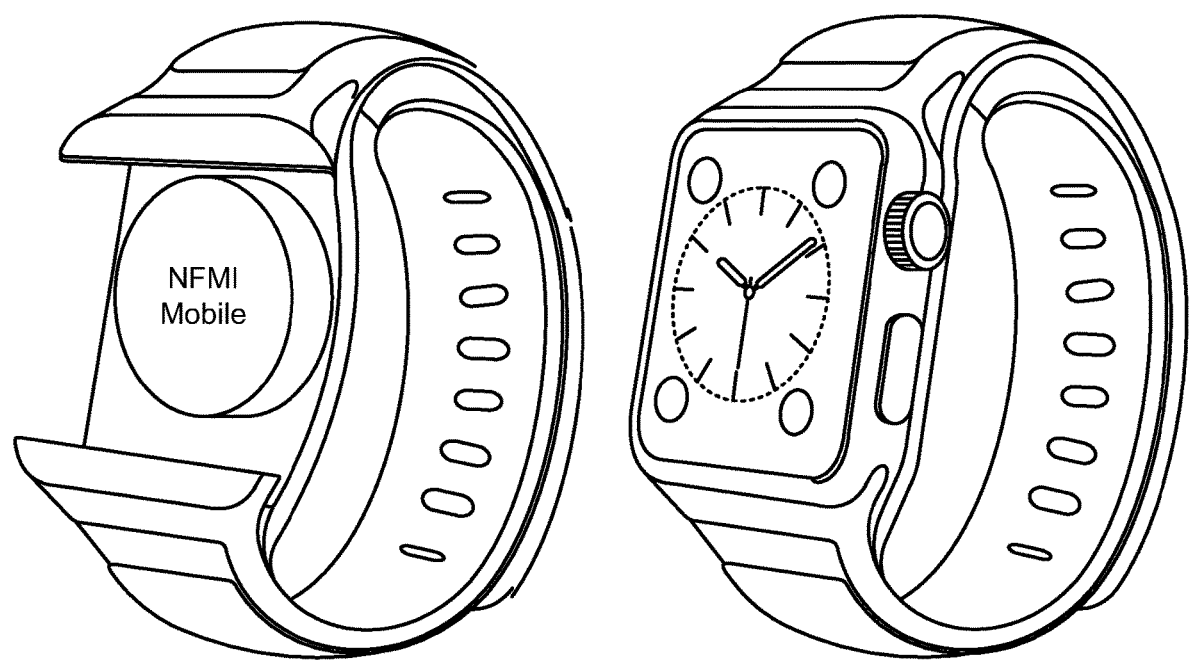
FIG. 6 shows an NFMI module removably attached to a band of a smart watch, in close proximity to a receptacle for the computing part of the smart watch.

FIG. 6 illustrates an NFMI Module that is part of the smart watch band. The term "smart watch" as used herein refers to a watch that can be worn by a user on a band, and which has computing and communication capabilities. On the left, the watch band is shown with the NFMI module, without the smart watch. On the right, the smart watch is installed on the band and the NFMI module is under the watch, which enables it to receive the BT RF signals even if under water. The benefit of such a close approximation to the watch is that it is able to receive RF transmission of the Smart Watch under water. The module may be removable from the watch band.

Figure 7:
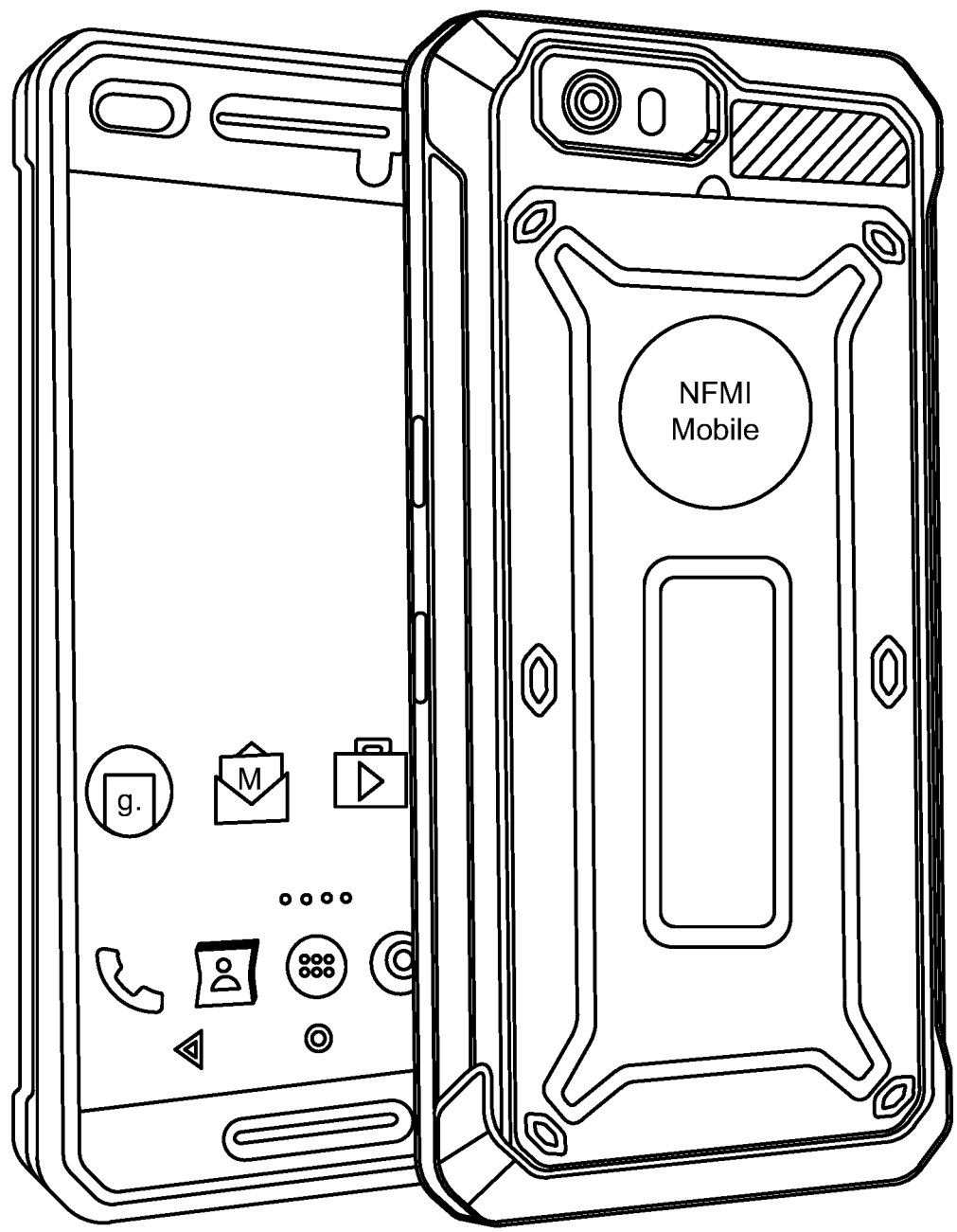
FIG. 7 shows an NFMI module that is part of a mobile device case.

In yet other implementations, the NFMI module could be built into a housing of a waterproof phone or other device case. The NFMI module can be completely removable and can operate without the case as well. FIG. 7 shows a case with an NFMI module. Other applications include a BT remote controller where an NFMI module bridge can be used to operate a normal BT remote under water. Two or more NFMI modules can be used between any standard BT devices, such as between smart phone (with BT capability) and standard BT headphones and thus bridge the BT connection in the aquatic environment.

Figure 8:
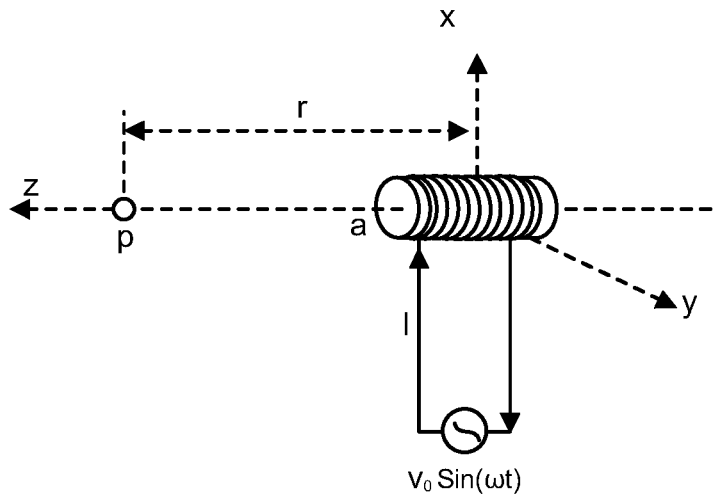
FIG. 8 illustrates a design of an NFMI transmitter antenna.

In another aspect, an NFMI antenna can be designed to encounter movement. An NFMI link is formed between two NFMI transmission/receiver (Tx/Rx) pairs (i.e. Tx/Rx modules). NFMI uses a modulated magnetic field to convey the data. An inductive wire loop is used as an antenna to transmit and receive such a message. The magnetic field by the Tx antenna is directly proportional to the circular dimension and number of turns. The larger the Magnetic Field—the better range and the reception of the signal, as illustrated in FIG. 8.

In order to enhance the strength of the magnetic field at the Tx side, the wire loop can take advantage of the physical embodiment of an accessory, such as the watch band surface area or the smartphone case surface area. The antenna can be embedded inside the watch band or the case to maximize the Tx magnetic field. The wire loop antenna maybe separate from the PCBA (NFMI Module) and built into the accessory.

Accordingly, the wire loop antenna can connect to the NFMI module when it is attached into the accessory.

A pair of coils with perfect parallel or coaxial alignment yield the maximum induced voltage; i.e., the minimum occurs when the coils are perpendicular or orthogonal to each other. The induced voltage is directly proportional to the size of the coil, its Q-factor, and the number of turns, N.

Voltage developed across the coil:

$$V_O = 2 \cdot \pi \cdot f \cdot N \cdot S \cdot Q \cdot B_Z \cdot \cos(\alpha)$$

where:
f=frequency of the carrier signal
N=number of turns of the receiver coil
S=surface area of the loop, in sq-m
Q=quality factor of receiver coil
$B_Z$=strength of magnetic field
$\alpha$=angle of arrival of the magnetic strength vector In order to maximize the reception, it is important to have a perfect parallel alignment of the Tx and Rx coils. The NFMI Modules may have multiple antennas and an antenna selection circuit will select and use the receiver antenna with the strongest voltage. These antennas maybe aligned at different angles $\alpha$ to encounter any movement of the user and select different NFMI antennas that best aligns with the reception, such as the user's arm with the smart watch and NFMI module will move during activity, i.e. swimming. The headphones with NFMI module may have several different antennas at different angles to best receive the induction and demodulate the data from the swimmer.

The NFMI antenna pairs maybe designed for sport-specific use, knowing or anticipating the user's movement patterns during the activity. For example, the angle of the antennas can be adjusted for this movement to maximize the time the antennas are parallel during certain motions, such as swim stroke or a flip turn at a wall. The antenna orientation and angle can be adjustable by the user, or either in the headphones or the watch or smart phone side. In some implementations, the user can turn/twist a knob or button that aligns the antennas. As a feedback for the user for the antenna effectiveness, different LED light colors or other visual signals can be generated and displayed, or an audio feedback could be generated and played.

The antenna angle $\alpha$ may be also adjustable by computer (MCU) logic. This logic can get feedback about the movements from a gyroscope and/or accelerometer circuits. The MCU logic can detect the alignment changes from the sensors, and then adjust the antenna angle to keep a perfect alignment for the antenna. The movement sensor alignment feedback of the user or antenna movement can be received from the sensors inside the smart watch or smart hone. Most smart phones and smart watches already contain such accelerometer and gyroscope(s) to be able to send this information to an NFMI module.

The Tx and Rx antennas can be aligned and kept parallel by the use of a compass or other directional sensor. A digital compass can be used to adjust and rotate the respective antennas and therefore always keeping the alignment of the antennas the same.

Figure 9:
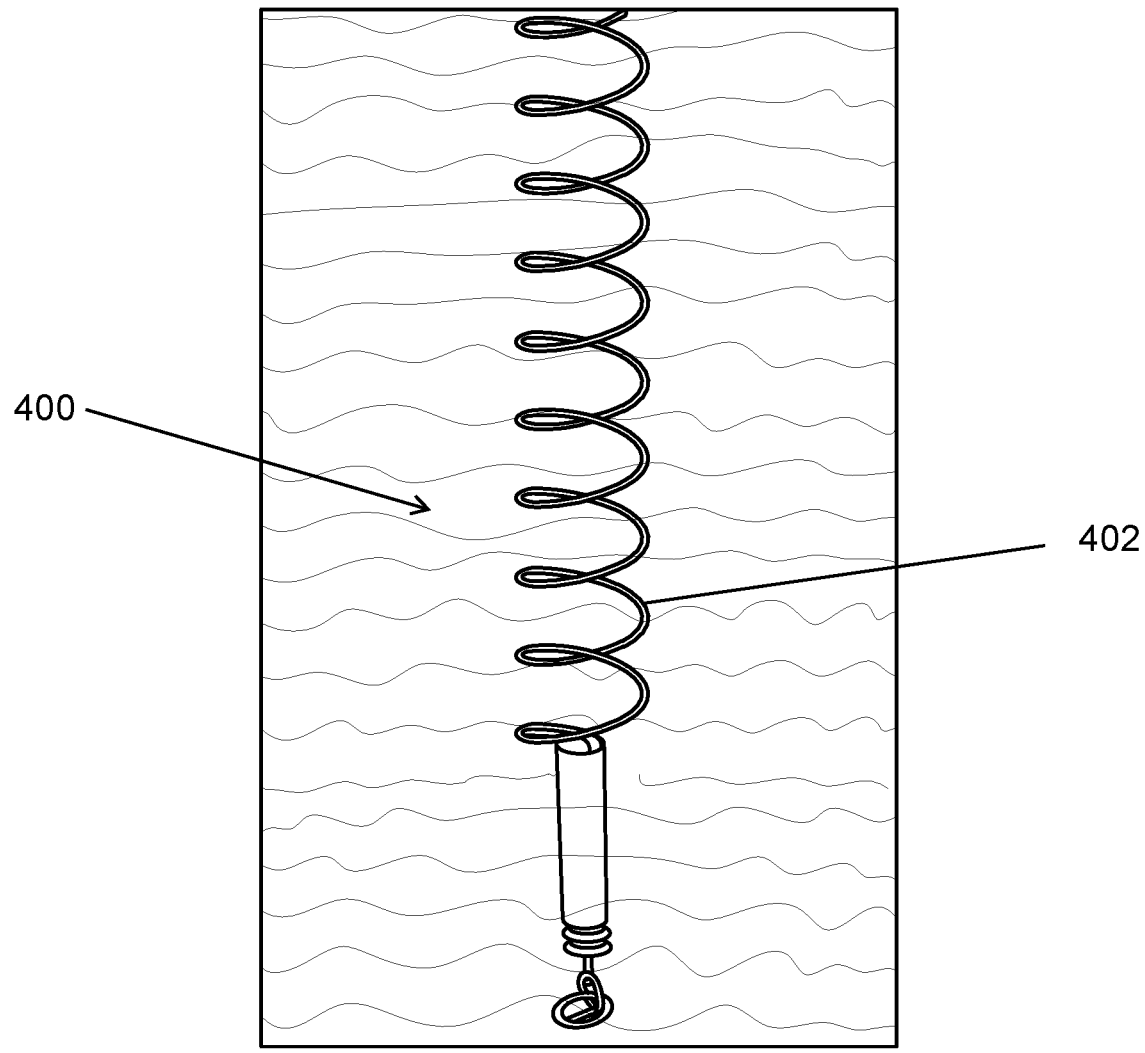
FIG. 9 illustrates an NFMI antenna in an aquatic environment, as part of a lane line that separates or demarcates a swim lane.

In some implementations, a Swimming Pool Data System (SPDS) using NFMI can be provided. One or more lane markers or lane lines can include wire loop antennas and relay NFMI data to the user. FIG. 9 illustrates lane markers 400 containing one or more wire loop antennas 402. The benefit of such an arrangement is lane markers 400 are always parallel to the surface of the water. Further, this would enable users to listen to data anywhere in the pool.

In some implementations, waterproof headphones include both Bluetooth and NFMI capabilities, where the user may select an "under water" mode and the headphones will use one or more NFMI modules or circuits to receive audio. Or, the user can select "land/normal" mode where the headphones will use Bluetooth or other RF connection. The waterproof headphones can also include automatic logic that selects the correct mode (NFMI or BT) automatically without the user having to select the mode. Such logic can determine, by way of any Rx sensors, if any data is being received from the NFMI side or not, and if so, whether the NFMI is being used and vice versa. The headphone can also detect the presence of water through conductivity or water pressure, and select the NFMI mode accordingly.

Although a few embodiments have been described in detail above, other modifications are possible. Other embodiments may be within the scope of the following claims.

The invention claimed is:

1. A wireless audio streaming system for streaming digital audio to a wireless headset in an aquatic environment, the system comprising:
a media player that generates and plays a digital media stream; and
a directional antenna that is communicatively coupled with the media player to receive the played digital media stream, the directional antenna including a tracking mechanism configured to track a position of the wireless headset and a beamformer configured for providing a radiation pattern according to the position of the wireless headset in the aquatic environment to transmit the played digital media stream via the radiation pattern to the wireless headset at the position within the aquatic environment.

2. The wireless audio streaming system in accordance with claim 1, wherein the directional antenna is communicatively coupled to the media player via a wireless interface.

3. The wireless audio streaming system in accordance with claim 1, wherein the directional antenna is communicatively coupled to the media player via a wired interface.

4. The wireless audio streaming system in accordance with claim 2, wherein the wireless interface includes inductive coupling via near field magnetic induction (NFMI).

5. The wireless audio streaming system in accordance with claim 3, wherein the media player includes a hardwired audio output, and wherein the wired interface includes a connection between the directional antenna and the hardwired audio output of the media player.

6. The wireless audio streaming system in accordance with claim 1, further comprising a case that receives both the media player and the directional antenna, the case positioning the media player in proximity to the directional antenna to facilitate communicatively coupling the directional antenna with the media player.

7. The wireless audio streaming system in accordance with claim 6, wherein the case encloses both the media player and the directional antenna.

8. The wireless audio streaming system in accordance with claim 7, wherein the case is waterproof.

9. The wireless audio streaming system in accordance with claim 6, wherein the case includes a stand that orients the case to facilitate the directional antenna providing the radiation pattern that is tailored for the aquatic environment.

10. The wireless audio streaming system in accordance with claim 6, wherein the directional antenna is integrated with the case.

* * * * *